Figure 1:
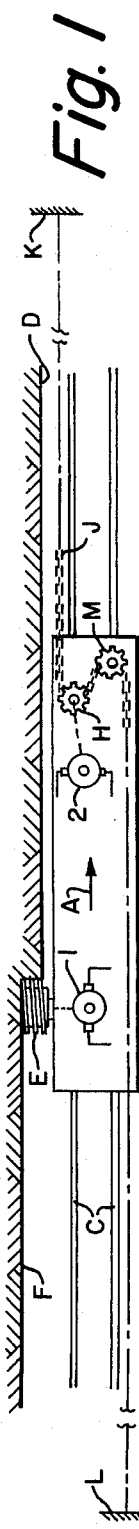

United States Patent [19]
Weber

[11] 3,988,578
[45] Oct. 26, 1976

[54] METHOD AND APPARATUS FOR CONTROLLING THE STEPLESSLY VARIABLE CUTTING RATE AND FEED RATE OF MINING MACHINES

[75] Inventor: Karl-Heinz Weber, Witten-Heven, Germany

[73] Assignee: Gebr. Eickhoff, Maschinenfabrik und Eisengiesserei m.b.H., Bochum, Germany

[22] Filed: June 2, 1975

[21] Appl. No.: 583,038

[30] Foreign Application Priority Data
June 4, 1974 Germany............................ 2426815

[52] U.S. Cl................................. 235/151.1; 299/1; 173/7; 318/39
[51] Int. Cl.[2] ...................... B23Q 5/28; G06G 7/66
[58] Field of Search......... 235/151.1, 151.3, 151.31, 235/151.11; 299/1; 173/7; 318/39

[56] References Cited
UNITED STATES PATENTS

| | | | |
|---|---|---|---|
| 3,162,249 | 12/1964 | Kuipers et al...................... | 299/1 X |
| 3,211,239 | 10/1965 | Hipple ..................... | 173/7 |
| 3,323,839 | 6/1967 | Addison et al.......................... | 299/1 |
| 3,378,303 | 4/1968 | Weber .................... | 299/1 |
| 3,400,768 | 9/1968 | Kuipers et al....................... | 299/1 X |
| 3,489,461 | 1/1970 | Lauber.................... | 299/1 |
| 3,633,081 | 1/1972 | Weber et al. ......................... | 318/39 |
| 3,809,870 | 5/1974 | Auble et al. ................ | 235/151.31 X |
| 3,839,628 | 10/1974 | Higgins et al..................... | 235/151.3 |

Primary Examiner—Edward J. Wise
Attorney, Agent, or Firm—Brown, Murray, Flick & Peckham

[57] ABSTRACT

Method and apparatus for controlling a mining machine, specifically a longwall mining machine, of the type in which the mining machine is advanced into a mineral seam by an advancing motor and a rotating mineral-cutting element on the machine is driven by a cutter drive motor. The invention resides in the realization that the specific cutting work of the machine, which is the work required to mine and remove a given unit of mined material, can be minimized by minimizing the differential quotient:

$$\frac{d(N_{Wa})}{d(V_{Wi})^2}$$

where:
$N_{Wa}$ is the driving power of the cutter drive motor; and
$V_{Wi}$ is the speed of the rotating mineral-cutting element.

In carrying out the invention, the driving power of the cutter drive motor and the speed of the advancing motor are measured. From these quantities, the specific cutting work of the mining machine is computed and at least one of the aforesaid motors is controlled to minimize the specific cutting work. In the preferred embodiment of the invention, the speed of the advancing motor is maintained substantially constant and the specific cutting work is minimized by varying the driving power of the cutter drive motor.

12 Claims, 3 Drawing Figures

METHOD AND APPARATUS FOR CONTROLLING THE STEPLESSLY VARIABLE CUTTING RATE AND FEED RATE OF MINING MACHINES

BACKGROUND OF THE INVENTION

While not limited thereto, the present invention is particularly adapted for use with so-called longwall miners. Such miners are provided with two electrical or hydraulic motors, one of which drives a winch for advancing the mining machine and the other of which drives a rotating mineral-cutting element. In a mining machine of this type, the driving energy is obtained from a three-phase supply applied to one or more electric motors through, for example, silicon-controlled rectifiers.

In mining machines of the type described above, it is known that load fluctuations will occur during the mining operation due, for instance, to differences in the hardness of the mineral being mined. Load fluctuations of this type can be constantly compared to a value corresponding to the nominal power output of the advancing motor. This is usually achieved by means of a current limiting unit which reduces the speed of the advancing motor in response to signals derived from current transformers, which measure the motor armature current, until the overload condition has disappeared. In the past, methods have also been devised for controlling mining machines in which the cutting speed of a rotating cutting element is varied as a function of the appropriate feed rate or advance rate of the mining machine. The ratio between cutting speed and feed rate in this case is fixed but variable so that irrespective of the instantaneous advance rate of the mining machine, the cutting thickness of the mineral engaged by the cutting element is the same in front of the individual cutter picks on the cutting element.

The prior art also discloses transmissions for mining machines in which the cutting tool is driven through two differential transmission branches which are parallel to each other. Advantageously, the one transmission branch, adapted to transmit a lower power level, is steplessly variable and superimposes a positive or negative rotational speed on the rotational motion of the other or main transmission branch.

It is desirable to obtain the mineral being mined with the heaviest possible cut by the cutting element because the specific cutting force diminishes with an increasing thickness of the cut. Mining machines, such as longwall mining machines, do not merely have lower energy requirements for removing a given volume of mineral, but also remove the mineral in larger pieces and thus improve its sales value while at the same time reducing the amount of dust which is caused in the mining operation.

The specific cutting work of a mining machine (i.e., the work required for obtaining a given unit volume of mineral) is defined by the ratio of the cutting element power $N_{Wa}$ to the mining machine feed rate $V_{Wi}$. It diminishes with an increasing thickness of cut and tends toward a minimum value. This may be stated by the expression:

$$A_{sp} = c \cdot \frac{N_{Wa}}{V_{Wi}}$$

where:

$A_{sp}$ is the specific cutting work,
$c$ is a constant,
$N_{Wa}$ is the driving power of the cutting element, and
$V_{Wi}$ is the winch speed.

The specific cutting work must diminish with a diminishing quotient $$\frac{N_{Wa}}{V_{Wi}}.$$

It reaches its minimum value if the differential quotient $$f'(A_{sp}) = \frac{d(A_{sp})}{d(V_{Wi})} = \frac{d(N_{Wa})}{d(V_{Wi})^2}$$

becomes zero.

The input power which flows to the cutting element of the mining machine is utilized not only for cutting the mineral seam but also for discharging the mined material from the side of the cutting element, usually a drum. While the quantity of mined material obtained during the mining operation is directly proportional to the feed rate of the rotating cutting element, the proportion of power supplied to the cutting element for clearing the mined material to the side increases superproportionally because the opening, defined by the cross section of the discharge ducts of the rotating cutting element depends on the dimensions of the rotating mining element or drum and, therefore, is constant. As the feed rate increases, an increasing proportion of the driving power supplied to the cutting element will be utilized for discharging the mined material from the side of the drum, and the power required for driving the cutting element will necessarily increase. Stated in other words, if the driving power for the cutting element is constant, the portion of the total power applied which is used for discharging the mined material will diminish as feed rate increases. An increasing feed rate of the mining machine also results in an increase in the penetration depth of the cutting picks on the rotating mining element into the face section and this leads to a further increase of cutting element loading and, consequently, cutting element driving power. The increase of power resulting therefrom may also be superproportional if the feed rate of the machine increases to such an extent that not only the cutting edges of the cutter picks on the cutting element but also the cutter pick shanks penetrate into the mineral, or the cutter pick holders come into contact with the work section of the face of the mineral being mined. Under these circumstances, the driving power of the cutting element will increase superproportionally and lead to a substantial deterioration of the ratio $$\frac{N_{Wa}}{V_{Wi}},$$

which is proportional to the specific cutting work.

Furthermore, only a small portion of the area of the mineral in front of the cutting element will be engaged by and detached by the cutting picks mounted on the circumference of the cutting element. The other portion of the mineral which remains between the rows of cutting picks on the cutting element will break off as soon as the notches cut by the cutting picks have reached a specific depth. Investigations have shown that the specific power consumption for cutting picks with uniform cutting track spacing diminishes with an increasing cutting depth under the effect of adjacent cutting tracks and reaches its optimum when a specific ratio between the thickness of the cut by the picks to the cutting pick spacing is obtained.

SUMMARY OF THE INVENTION

In accordance with the present invention, the feed rate and/or cutting speed of the cutting tool of a mining machine are regulated such that the mineral being mined is always obtained with the maximum possible thickness of cut and at the maximum permissible power rating of the machine so that the ratio between cutting depth and cutting track spacing is optimized. More specifically, an object of the invention is to minimize the specific cutting work or a mining machine by measuring the driving power of the cutter element drive motor, measuring the speed of the advancing motor for the mining machine, and computing from the measured values the specific cutting work of the mining machine. Should the specific cutting work increase, at least one of the aforesaid motors, preferably the cutter element drive motor, is regulated to minimize the specific cutting work.

To this end, the invention preferably regulates the cutting speed of the cutting element by a control variable which corresponds to the differential quotient $$\frac{d(N_{wa})}{d(V_{wi})^2}$$

formed from the differential of the cutting element power and the differential of the speed of advance of the mining machine, the control variable altering the cutting speed of the cutting element so as to reduce the value of the differential quotient and, hence, the value of the specific work of the machine. A mining machine regulated in this way always operates with optimum cutting power. That is, it obtains a maximum amount of material for the power input supplied to it by the cutting element motor because the ratio of cutting element power input to advancing speed constantly maintains its optimum value at which the quotient between cutting depth and cutting track spacing is at an optimum.

Mining machines of the type described above can be provided with two electric motors, one for a winch which advances the mining machine and another of which drives the cutting element. Alternatively, a single electric motor can be utilized to drive fluid pumps which, in turn, drive fluid motors for the winch and cutting element. In mining machines of this latter type, the motor load current regulates the advance speed of the winch. An electrical signal is generated which is proportional to the main motor output. By subtracting the power supplied to the advancing winch from the total main motor output to derive the power supplied to the cutting element, and by determining the speed of the winch, it is possible to derive the differential quotient $$\frac{d(N_{wa})}{d(V_{wi})^2}$$

which serves as a control variable for the cutting speed of the cutting element. The invention can thus be utilized for mining machines utilizing only a single electric motor which drives both the advancing winch and the cutting element through fluid motors. In the case of mining machines utilizing separate electric motors for the advancing winch and the cutting element, the differential quotient which functions as a control variable can be derived from an electrical signal which is proportional to the load current J of the cutter drive motor and by a variable, the voltage $U_T$, which is proportional to the speed of the advancing motor. Alternatively, in the case of a mining machine in which the cutter element and the advancing winch are driven by the same motor, the differential quotient can be formed from an electrical signal which is proportional to the load current of the single drive motor and an electrical signal which is proportional to the speed of the advancing winch, if the electrical signal corresponding to the load current is reduced by the product of two electrical signals comprising the speed of the advancing winch and the winch torque. The reduced electrical signal then corresponds to the power supplied to the cutting element.

In order to detect and achieve the desired reduction of the differential quotient, successive output signals of a differential quotient computer can be compared with each other. Irrespective of the sign of the difference thus formed, a signal is first produced which corresponds to the difference between the aforementioned signals and increases the cutting element speed, the sign of the last-mentioned signal being reversed and the cutting speed reduced if subsequently detected signal differences or succeeding signal differences are negative. In this manner, the mining machine completely automatically selects the operating range characterized by minimum specific work and in which range the mining machine mines the remaining mineral at the maximum permissible input power and maximum permissible thickness of cut.

Assuming that separate drive motors are used for the advancing winch and the cutter element, a tachometer generator is coupled to the winch drive motor; while the cutting element drive motor is provided with a shunt adapted to measure load current. The winch motor is regulated by a differential quotient computer having one input connected to the aforesaid tachometer of the winch drive motor and another input connected to the shunt in the armature circuit of the cutting element drive motor. The output of the differential quotient computer is connected through a store register and a comparator to a speed regulator, the output signal of which regulates the speed of the cutting element drive motor. The tachometer of the winch drive motor supplies a signal which is proportional to the rotational speed of the advancing winch and, therefore, to the winch speed. On the other hand, the shunt at the input to the cutter drive motor produces a signal which is proportional to the driving power of the cutting element. Both signals are transmitted to the differential quotient computer where they are converted into a control variable, namely, the differential quotient, which is applied to the store register and briefly retained therein. The deviation during this time interval between successive output signals of the differential quotient computer is detected by a comparator connected to the output of the store register and forms an output signal which represents this change with respect to time of the control variable and causes the speed regulator for the cutter drive motor to initially transmit a signal which causes an increase in the cutter speed. If the comparator then detects a falling trend in the control variable, the speed regulator will continue to raise the rotational speed of the cutter element drive motor for as long as the falling trend of the control variable persists and the until the desired minimum value is reached. On the other hand, the speed increase of the motor is immediately interrupted and the motor speed instantly reduced if the falling trend of the control variable as detected by the comparator is reversed and the control variable (i.e., specific work) increases.

According to a further feature of the invention, mining machines with a single motor for driving both the advancing winch and the cutting element and in which the motor load current regulates the winch control, are provided with a strain gage or oil pressure gage for measuring the winch torque together with a tachometer for measuring the rotational speed of the advancing winch. These parameters are converted into electrical signals and applied to a multiplier whose output is applied to a subtraction circuit, the other input of which is connected to a current transformer of the main drive motor. The system is provided with a differential quotient computer with one input connected to the tachometer for the winch drive motor and one input connected to the subtraction circuit. The output of the subtraction circuit, in turn, is connected through a store register and a comparator to a speed controller which produces an output signal defining the rotational speed of the cutting element.

If the mining machine is equipped with separate drive motors for the advancing winch and the cutting element, such separate motors can be supplied with power through controlled rectifiers. The speed of the motors can, in this way, be steplessly varied by varying the firing angles of the controlled rectifiers.

According to still another feature of the invention, mining machines in which the advancing winch and the cutting element are driven by a single motor can be constructed such that the single motor is coupled through a differential transmission to the cutting element, the transmission branch for transmitting the power to the cutting element being steplessly variable and adapted to superimpose a positive or negative speed on the speed of the other branch of the transmission. The transmission branch which transmits the power to the cutting element and the steplessly variable superimposing speed can, for example, comprise a hydraulic, a mechanical or an electrical transmission.

Figure 2:
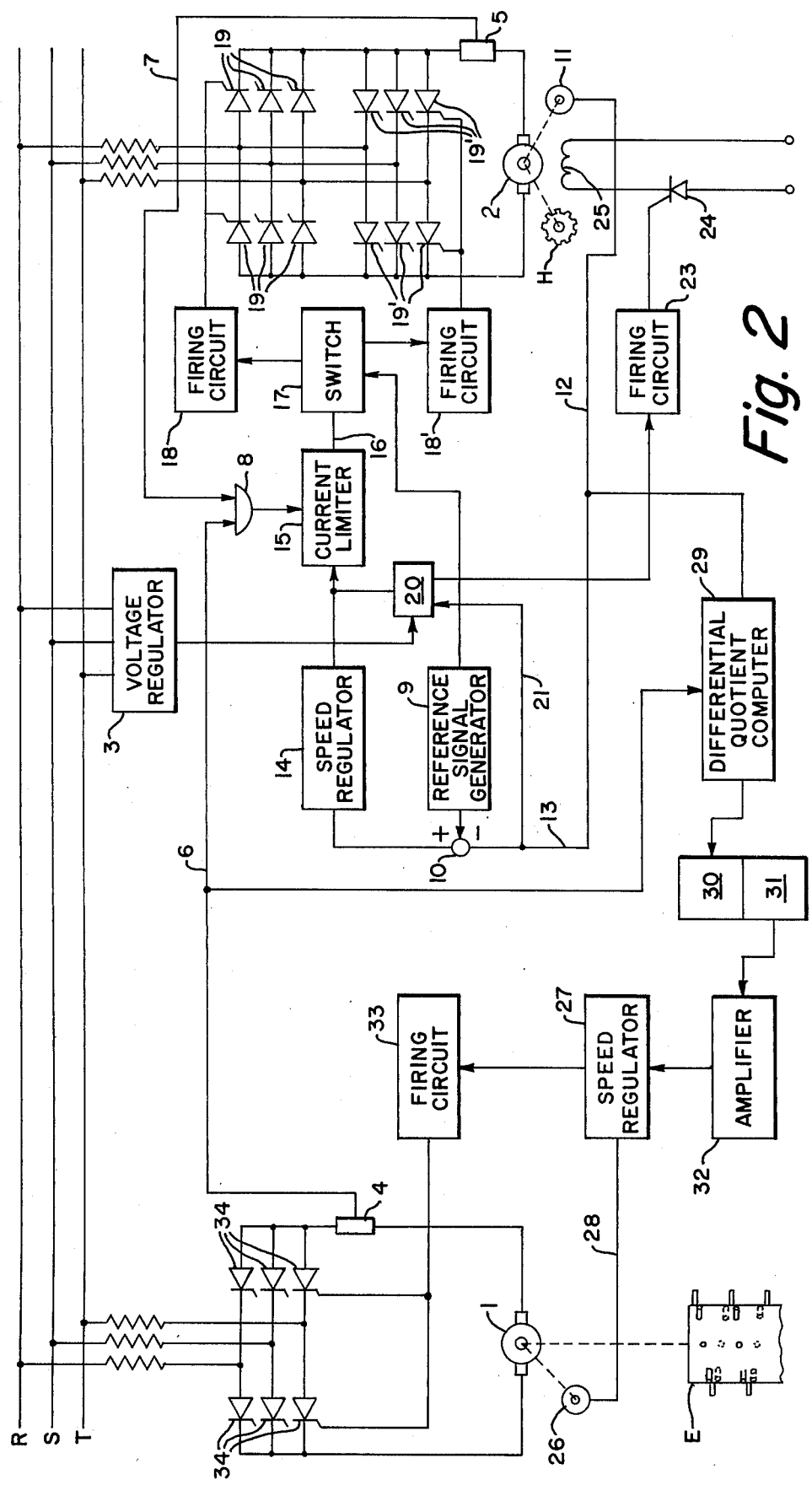
Figure 3:
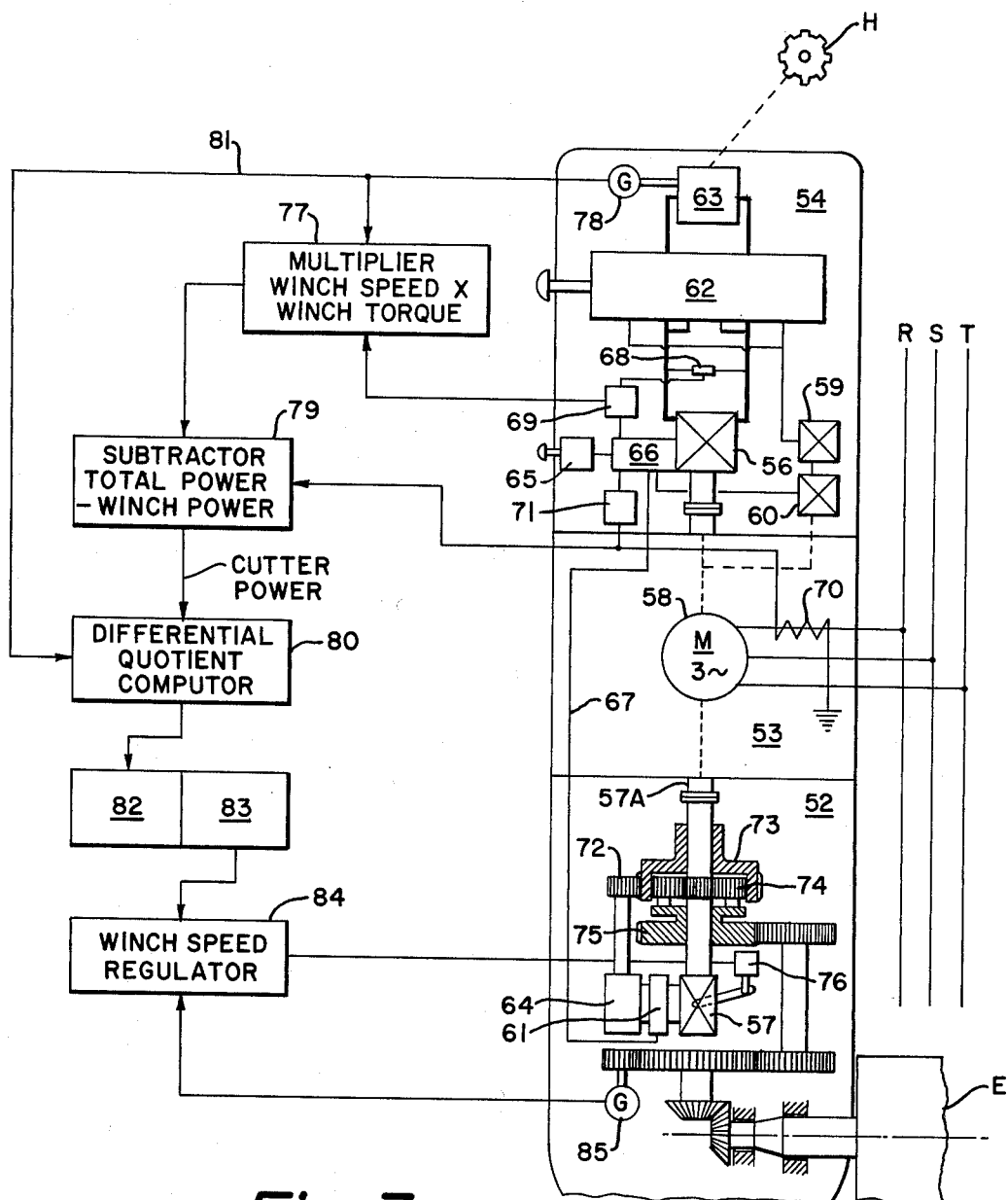

The above and other objects and features of the invention will become apparent from the following detailed description taken in connection with the accompanying drawings which form a part of this specification, and in which:

FIG. 1 is a schematic illustration of one type of mining machine with which the system of the invention can be utilized;

FIG. 2 is a circuit diagram of a mining machine constructed in accordance with the teachings of the invention and equipped with separate electrical drive motors for the advancing winch and the cutter element; and FIG. 3 is a diagrammatic plan view of a mining machine incorporating the principles of the invention but employing a single electrical drive motor for both the advancing winch and the cutter element of the mining machine.

With reference now to the drawings, and particularly to FIG. 1, the arrow A denotes the direction in which a longwall mining machine B movable on tracks or guideways C, advances along the face D of a mineral seam which, in the usual case, is a coal seam. The mining machine B is provided with a rotary cutting element E that cuts and removes the coal and exposes a new coal face F when the mining machine B advances along the coal face D that has been exposed by the preceding cut. The mining machine can be driven by means of an advancing direct current drive motor 2 connected to a winch-type chain wheel H around which a chain J passes. The chain J is secured at one end to the longwall coal face D as at K; and its other end is secured at the opposite end of the longwall coal face as at L. The chain J extends from point K, around the driving chain wheel H, thence around a guide wheel M to point L where it is secured. With the arrangement shown, it can be seen that as the advancing motor 2 rotates in one direction, the mining machine B will be caused to move in the direction of arrow A; whereas, when the advancing drive motor 2 is reversed, so also is the direction of movement of the mining machine.

The rotary cutting element E is driven by means of a motor 1. The cutting element E is usually carried on a pivoted arm such that it can be raised or lowered; and in many cases the mining machine will incorporate two cutter elements on pivoted arms, one at the front and one at the back, such that the forward cutting element can work the floor of the seam while the rear element works the upper seam portion. In that case, both cutter elements are driven by a single motor 1.

In the operation of a mining machine such as that shown in FIG. 1, the motor 2 will cause the mining machine to advance to the right along the direction of arrow A; while the cutting element E rotates and removes an entire layer of the longwall face. As was mentioned above, the cutting element E is pivotally mounted such that it can be raised or lowered; and, thus, two or more excursions of the mining machine can be made to remove the entire height of the coal face, depending upon its height. After the entire face is removed, the tracks C are then moved upwardly as viewed in FIG. 1, whereupon the process is repreated to remove a succeeding layer of coal. As will be seen, it is also possible to utilize a single electric motor which drives respective fluid motors for the winch and cutting element.

An embodiment of the invention is shown in FIG. 2 wherein separate drive motors are used for the advancing winch and the cutter element, respectively. The three conductors RST of a three-phase system supply electric power to both of the drive motors 1 and 2 which are operated as direct current machines. Elements 4 and 5 comprise parallel-connected shunts, the shunt 4 constantly supplying a direct current voltate to an OR network 8 through a conductor 6. Similarly, the shunt 5 supplies a direct current voltage to the same OR network 8 through a conductor 7. The magnitudes of the two direct current voltages depend on the instantaneous values of the load currents of the two motors 1 and 2 and are proportional to the load applied to the appropriate motor 1 or 2, respectively. The set-point which defines the rotational speed of the advancing winch motor 2 is manually determined by means of a switch-type reference signal generator 9. The output of the generator 9 is applied to a summation point 10 which also has applied thereto through conductors 12 and 13 the output of a tachometer generator 11 coupled to the shaft of motor 2. A voltage corresponding to the rotational speed of the motor 2, having a polarity reversed with respect to that from generator 9 is thus applied to the summing point 10. At point 10, the voltage from tachometer 11 and that from generator 9 form a difference voltage. Accordingly, assuming that the voltage from tachometer 11 is not the same as that from generator 9, a difference voltage will be generated which is applied to a speed regulator 14. The output from the speed regulator 14 is then applied to a current limiter 15 whose output is applied via lead 16 to a switch 17. Depending upon the desired direction of rotation of the advancing winch motor 2 as defined by the sign of the set-point signal from generator 9, the output voltage on lead 16 is applied through switch 17 to either thyristor firing circuit 18 or thyristor firing circuit 18'. Thyristor firing circuit 18 supplies firing pulses to the thyristor bridges 19; while thyristor firing circuit 18' supplies firing pulses to the thyristor bridges 19'. The winch motor, therefore, will rotate in a direction depending upon which set of thyristors 19 or 19' are being fired; and this, in turn, is dependent upon the sign of the reference voltage from generator 9.

When the two motors 1 and 2 are switched ON, the OR network 8 is constantly supplied with two direct current voltages which correspond to the instantaneous values of the two load currents supplied to the motors. Only the higher of the two voltages, however, can pass through the OR network 8 to the current limiter 15. It is only when this voltage exceeds a limiting value defined by the permissible load current of the motors 1 and 2 that the signal from the speed regulator 14 will be reduced by the current limiter 15 to increase the phase triggr angle of the voltage half-waves of the load current by means of the firing circuits 18 and 18', thus reducing the rotational speed of the winch motor 2. This occurs only if one of the two motors 1 or 2 carries a load current which exceeds a minimum permissible value. That is, it is only then that the current limiter 15 will respond to the output voltage of the OR network 8 to reduce the rotational speed of the winch motor 2 until the overload condition of the cutting tool coupled to the motor 1 has been terminated. The limiting value of the current limiter 15 can be adjusted in order to vary the permissible load current of both motors 1 and 2; while the output signals of both shunts 4 and 5 can be increased or reduced in the desired sense by means of amplifiers, not shown.

In a normal cutting opertion, the load current of the winch motor 2 will not normally reach the value set by means of the reference generator 9 since this value is set very high when the machine is switched ON in order to completely utilize the performance capacity of the mining machine. This constantly insures that the cutter element drive motor 1 is loaded to its maximum permissible limit.

The output voltage of the speed regulator 14 is also applied to a speed relay 20 during a mining operation. Likewise, the output of tachometer generator 11 is applied through leads 12, 13 and 21 to the same speed switch 20. If the voltage output of the tachometer generator 11, proportional to the speed of the advancing winch motor 2, exceeds a specific value close to that obtained at the maximum rotational speed of the advancing winch motor which can be achieved by armature control, the speed relay 20 will apply the output voltage of the speed regulator 14 to thyristor firing circuit 23, provided that the voltage at the output of the speed regulator 14 is higher than the voltage output of tachometer generator 11. The resultant voltage difference is superimposed in switch 20 on a voltage proportional to the line voltage derived from voltage regulator 3, the switch actuating the firing circuit 23 to reduce the current phase angle of thyristor 24 for the circuit which supplies current to the field winding 25 for motor 2. The phase angle of the voltage half-waves passing through the thyristor 24, therefore, increases and the voltage of the field winding 25 is reduced. The weakening field, the strength of which is inversely proportional to motor speed, continues to increase the motor speed until the deviation between the setpoint voltage at the output of regulator 14 and the voltage output of tachometer generator 11 will no longer exist. This situation can occur, for example, whenever the cutting tool shown in FIG. 1 and connected to the motor 1 passes into a part of the seam containing particularly soft, easy mineral material which calls for only a low driving power from the cutting element and the winch. The winch speed and, therefore, the feed rate of the mining machine rapidly rises under these conditions to a value at which the voltage of the tachometer generator 11 exceeds the trigger value required for the speed relay 20. However, the load current of the winch motor 2 does not reach its permissible maximum value owing to the low resistance to the feed motion. The deviation between set-point and measured value of speed at summation point 10 allows the speed to increase still further to a value at which the voltage of the tachometer generator 11 reaches the value of the set-point voltage at the output of reference generator 9.

The direct current motor 1 which drives the cutting element E is also coupled to a tachometer generator 26 whose output voltage is supplied through a conductor 28 to a speed regulator 27 for the motor 1. Conductors 12 and 6 connect the tachometer generator 11 and the shunt 4 in the armature circuit of motor 1 to a differential quotient computer 29. One of the two inputs to the differential quotient computer 29 is, therefore, the voltage of the tachometer generator 11; and the other input is a signal voltage which is proportional to the load current of the motor 1. During a mining operation, the differential quotient computer 29 constantly forms an output signal from the two aforementioned signal voltages which are proportional to winch speed and the load current of the cutting element drive motor 1. This output signal is proportional to the differential quotient:

$$\frac{d(J)}{d(U_T)}$$

where J is proportional to the current signal derived from the shunt 4 and $U_T$ is proportional to the voltage derived from the tachometer generator 11 and is proportional to the speed of winch motor 2. The output of the differential quotient computer 29 is fed into a store register 30 and is briefly retained therein. During this time interval, which amounts to only a fraction of a second, a comparator 31 associated with the store register 30 compares two successive values of the stored signal, defines the difference between them and supplies an output signal corresponding to the difference to the speed regulator 27 via amplifier 32. The speed regulator 27 initially raises the speed of the motor 1 irrespective of whether the differential quotient, which is the control variable for the cutting element speed, has a falling or a rising trend. That is, the speed regulator 27 causes the firing circuit 33 to supply firing pulses to thyristors 34 which drives them into a conductive state for a higher load current. The resultant input signal change to the differential computer 29 instantly results in a further change of the differential quotient supplied to the store register 30. If the difference detected by the comparator 31 remains positive or if it has become positive due to a load change, the motor speed will be further increased by the speed regulator 27 until the difference diminishes and the differential quotient has reached zero. Alternatively, the speed of the cutting element drive motor 1 is instantly reduced if the comparator 31 detects that the difference has remained negative despite the initiated change in load or has become negative due to a change of load.

The output signal of the comparator 31 continues to guide the rotational speed of the cutter element drive motor 1 in the instantaneous sense of control and, if possible, to a value at which the specific cutting work reaches its minimum. If the differential quotient increases, the comparator 31 will always reverse the sense of control and prevent any further increase in the specific cutting work.

In FIG. 3, an embodiment of the invention is shown wherein only a single alternating current electric drive motor is utilized to drive both the advancing winch motor as well as the cutter element drive motor. The mining machine includes a cutting element head section 52, the electric motor drive section 53 and the advancing winch section 54. The cutting element E is rotatably supported as shown on the cutting element section 52.

The embodiment shown in FIG. 3 incorporates two fluid circuits, each supplied by its own fluid pump 56 or 57 connected to an electrical drive motor 58. Pump 57 is connected to motor 58 through freely-rotatable shaft 57A which carries on its periphery a differential transmission, hereinafter described. Fluid pump 56 is utilized through manual valve 62 to drive a fluid motor 63 coupled to the winch H. The fluid pump 57, on the other hand, is utilized to drive fluid motor 64 which, in turn, drives a planetary gear train in a manner hereinafter described. Motor 58 is supplied with three-phase currrent from a three-phase supply RST as shown. Additionally, the motor 58 drives auxiliary fluid pumps 59 and 60.

When the motor 58 of the mining machine is energized, the fluid pumps 56, 57, 69 and 60 are set into rotation. The fluid pump 56 which supplies the advancing winch section 54 is normally maintained in an idling position with no fluid being delivered at its high pressure side. The pump 57 which supplies the cutting element section 52 circulates unpressurized fluid through the spool of a valve block 61 during idling. The pressure supplied by fluid pump 59 is utilized to release a spool within valve block 62 of the advancing winch section 54 such that the valve 62 can be manually set to a position in which fluid will flow through the heavy lines shown in FIG. 3 from pump 56 to fluid motor 63. The valve block 61 disposed between the fluid pump 57 and fluid motor 64 contains safety valves and stop valves required for the cutting element circuit as well as valve spools which can be biased against spring pressure by the pressure of the control circuit of pump 60.

If the pressure level of the previously-unpressurized control circuit supplied by the fluid pump 60 is raised by operation of a manually-operated control 65 connected to pump control element 66, the pump 56 will deliver pressurized fluid to fluid motor 63, assuming that the valve 62 is open. At the same time, actuation of the switch 65 will cause control element 66 to deliver fluid under pressure through conduit 67 to the valve block 61. This biases a spool element within the valve block 61 against spring pressure to connect the fluid pump 57 to the fluid motor 64. The mining machine then moves at a feed rate defined by the manually-adjusted control 65; and the cutting element E will operate at a speed defined by the transmission ratio of the mechanical transmission branch coupled to the pump 57 (i.e., shaft 57A) reduced by the speed of the hydraulic transmission branch, hereinafter described. As will be appreciated, the feed rate of the mining machine, determined by the speed of the fluid motor 63, and the rotational speed of the cutting element E, are both controlled by the manual control means 65 supplied by fluid under pressure from pump 60. Check valve means 68 connected to both the delivery and return sides of the pump 56 applies the pressure on the delivery side thereof to a pressure-sensitive control element 69. The load current of the motor 58 is also applied via current transformer 70 to a control means 71 which forms part of the control circuit for the pump 56.

If the winch and/or the cutting element are overloaded by an excessive feed through the manually-adjusted control 65, the pressure rise which occurs in the circuit for fluid motor 63 and/or the load current which then flows through the motor 58 will reduce the pressure of the fluid delivered by pump 56. That is, an excessive rise in pressure will be sensed by element 69; while an excessive rise in load current for motor 58 will be sensed by element 71. In either case, pump control 66 will reduce the output pressure of pump 56. Since the feed rate of the mining machine is proportional to the pressure output of pump 56, the feed rate will drop or rise together with the pressure.

With reference now to the cutting element section 52, the fluid motor 64 is connected through spur gear 72 to a casing 73, freely rotatable on shaft 57A, which meshes with the planetary gears 74. These same gears mesh with gear teeth on the shaft 57A and are supported on carrier 75, also freely rotatable on shaft 57A, but connected through suitable gearing as shown to the cutting element E. The resultant rotational speed of the planetary gear carrier 75 is, therefore, dependent upon the relative rotational speeds of the fluid motor 64 and the electric motor 58. That is, if the spur gear on casing 73 is permitted to idle, the rotational speed of shaft 57A will be transmitted directly to carrier 75 while the individual planetary gears do not rotate. However, rotation of gear 72 by motor 64 in one direction will tend to decrease the speed of carrier 75 beneath the speed of shaft 57A; while rotation of gear 72 in the opposite sense will increase the speed of the carrier above that of shaft 57A.

The final control element 76, coupled to the output of a speed controller 84, can move the fluid pump 57 from its maximum delivery position with a negative sense through zero to the maximum delivery position with a positive delivery sense. If the basic rotational speed of the mechanical transmission branch just described is assumed to be positive, the rotational speed of the cutting element, immediately after the various components are energized by the adjusting means 65 will have its minimum value since the negative superimposing speed will be maximum and the positive basic rotational speed of the cutting element is correspondingly reduced with the fluid pump 57 in a position of maximum delivery with a negative delivery sense. Thereafter, the delivery position of the fluid pump 57 moves toward zero, and the rotational cutting element speed steadily increases. After passing through zero and moving toward the maximum delivery sense in the positive direction, the speeds of both transmission branches are added and the speed of the cutting element E moves toward its maximum value.

One signal voltage proportional to the winch speed and one signal voltage proportional to winch torque are constantly applied to both inputs of an electrical multiplier 77 when the mining machine is in operation. The multiplier 77 forms a product from both signal voltages, one of which is proportional to rotational winch speed and is produced by means of a tachometer generator 78. The other of the signals is proportional to the pressure in the delivery circuit to the winch drive motor 63, and therefore, proportional to winch torque, and is produced by means of the pressure transducer 69. As a result, the multiplier 77 produces an electrical signal which is always proportional to winch power.

The output of the multiplier 77 is applied to a subtraction circuit 79 where it is subtracted from a signal derived from the current transformer 70. This latter signal, which is proportional to the current supplied to motor 58, is also proportional to the total power supplied to both the winch and the cutting element. As a result, and by subtracting the winch power from the total power input to the mining machine, an output is derived from the subtraction circuit 79 which is proportional to the power supplied to the cutting element E. This signal, proportional to cutting element power, is supplied to a differential quotient computer 80. From this signal, proportional to cutting element power, and from the voltage of tachometer 78 which is proportional to winch speed (supplied via conductor 81), the computer 80 derives a signal which is proportional to the differential quotient $$\frac{d(N_{Wa})}{d(V_{Wi})^2}.$$

This last-mentioned signal at the output of computer 80 is applied to a store register 82 and a comparator 83 in much the same way as in the embodiment of FIG. 2. The output signal of the comparator 83 which represents the rising or falling trend of the differential quotient is applied as a set-point to one of the two inputs of a speed controller 84. The other input to the speed controller 84 is an electrical signal proportional to the rotational speed of the cutting element 55 as derived from tachometer generator 85. The speed controller 84 increases the cutting element speed through control element 76 by reducing the output of the fluid pump 57 and, therefore, the negative rotational speed of the fluid motor 64. This process continues until the differential quotient reaches its minimum value or even zero value and after the set-point is equalized with the measured value within the speed controller 84. The minimum value of the differential quotient deviating from zero is defined either by the permissible load current of the motor 58, which limits the pressure output of the pump 56 and, therefore, the feed rate of the mining machine, or it is limited by the permissible pressure of the fluid circuit for the winch which reduces the delivery of the fluid pump 56 by means of the pressure transducer 69.

In the embodiment of the invention shown in FIG. 3, the speed controller 84 also initially increases the rotational speed of the cutting element when the mineral cutting process commences as described above irrespective of whether the output signal of the differential computer 80 rises or falls. If the output signal of the differential computer 80 retains its falling trend or if it diminishes due to an increase of the rotational speed of the cutting element E, the control process will continue in this sense. That is, there will be an increasing cutting element speed until the differential quotient computer 80 ceases to supply an output signal and the specific cutting work has reached minimum value. In the other case in which the output signal of the differential quotient computer 80 rises or retains its rising trend due to the commencing increase of rotational speed of the cutting element, the comparator 83 will instantaneously reduce the speed of the cutting element through the speed controller 84 in order to reverse the trend of the output signal and reduce the cutting work to a minimum value.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A method for controlling a mining machine of the type in which the mining machine is advanced into a mineral seam by an advancing motor and a mineral-cutting element on the mining machine is driven by a cutter drive motor, which comprises the steps of measuring the driving power of the cutter drive motor, measuring the speed of said advancing motor, computing from said measured values of driving power and speed the specific cutting work of the mining machine, and controlling at least one of said motors to minimize said specific cutting work which is a measure of the work required to obtain a given unit volume of mined material.

2. The method of claim 1 wherein said cutting element drive motor is controlled to minimize said specific cutting work.

3. The method of claim 1 wherein the specific cutting work of the mining machine is defined by:

$$\frac{d(N_{Wa})}{d(V_{Wi})^2}$$

where $N_{Wa}$ is the driving power of the cutting element and $V_{Wi}$ is the speed of said advancing motor.

4. The method of claim 3 wherein a single electrical motor drives a cutter drive motor and an advancing motor, and including the steps of producing a first electrical signal proportional to the load current to said single electrical motor, subtracting from said first electrical signal a second electrical signal proportional to advancing motor power to derive a third electrical signal proportional to cutting element power, producing a fourth electrical signal proportional to winch speed, and deriving from said third signal and said fourth signal a fifth electrical signal proportional to:

$$\frac{d(N_{wa})}{d(V_{wi})^2}.$$

said fifth signal controlling the speed of said cutting element.

5. The method of claim 4 wherein said second electrical signal is derived from electrical signals proportional to advancing motor speed and advancing motor torque.

6. The method of claim 3 including the steps of comparing successive electrical signals proportional to specific cutting work, initially raising the speed of the cutter drive motor irrespective of the sign of the difference of the compared signals, and thereafter increasing or decreasing the speed of said cutter drive motor depending upon the sign of the difference of the compared signals.

7. The method of claim 1 wherein the cutting element and advancing motor comprise electrical motors and including the steps of producing a first electrical signal J proportional to the cutter drive motor armature current, producing a second electrical signal $U_T$ proportional to the speed of said advancing motor, in response to said first and second signals producing a third electrical signal proportional to:

$$\frac{d(J)}{d(U_T)},$$

and controlling said cutter drive motor as a function of said third signal.

8. In a mining machine of the type in which the mining machine is advanced into a mineral seam by an advancing motor and a mineral-cutting element on the mining machine is driven by a cutter drive motor, means for producing a first electrical signal indicative of the driving power of the cutter drive motor, means for producing a second electrical signal indicative of the speed of said advancing motor, computer means responsive to said first and second electrical signals for producing an output signal proportional to:

$$\frac{d(N_{wa})}{d(V_{wi})^2}$$

where $N_{wa}$ is the driving power of the cutter drive motor and $V_{wi}$ is the speed of said advancing motor, and means responsive to said output signal for controlling at least one of said motors in a manner to minimize said output signal.

9. The mining machine of claim 8 wherein said cutter drive motor is an electrical motor and including a shunt in the armature circuit of said cutter drive motor for deriving said first electrical signal, and tachometer generator means coupled to said advancing motor for deriving said second electrical signal.

10. The mining machine of claim 8 including a store register and comparator means coupled to the output of said computer means for sampling successive outputs of the computer means.

11. The mining machine of claim 10 including a speed regulator for said cutter drive motor, and means coupling the output of said comparator means to the input of said speed regulator.

12. The mining machine of claim 8 wherein said advancing motor and cutter drive motor comprise fluid motors driven by pumps coupled to a single electrical drive motor for the mining machine, and including means for determining the driving power of said advancing motor, means for determining the driving power of said single electrical motor, and means for subtracting the power of the advancing motor from said single electrical drive motor to derive said first electrical signal indicative of the driving power of said cutter drive motor.

* * * * *